United States Patent [19]

Stramer

[11] Patent Number: 5,086,288

[45] Date of Patent: Feb. 4, 1992

[54] VATS INTERROGATOR ACCESSORY

[75] Inventor: Carl Stramer, Sterling Heights, Mich.

[73] Assignee: Borroughs Tool & Equipment Corporation, Kalamazoo, Mich.

[21] Appl. No.: 525,770

[22] Filed: May 18, 1990

[51] Int. Cl.5 .................. B60R 25/10; E05B 45/06
[52] U.S. Cl. ................... 340/426; 340/543; 340/825.31; 307/10.3; 307/10.6; 361/172
[58] Field of Search ........... 340/426, 542, 543, 825.31, 340/725.32, 825.34, 825.5; 307/10.1, 10.2, 10.3, 10.4, , 10.5, 10.6; 361/171, 172; 180/287

[56] References Cited

U.S. PATENT DOCUMENTS

| | | | |
|---|---|---|---|
| 3,004,170 | 10/1961 | Greenspan | 307/10.5 |
| 3,892,976 | 7/1975 | Tsevdos et al. | 307/10.3 |
| 4,232,291 | 11/1980 | Bernier | 340/543 |
| 4,274,080 | 6/1981 | Brunken | 340/543 |
| 4,296,402 | 10/1981 | Szczepanski | 307/10.5 |

OTHER PUBLICATIONS

"The Latest About VATS", by Bill Phillips, Keynotes, vol. 36, No. 3, Mar. 1990, pp. 12-14.
"VATS Technology Reduces Car Theft Rate", by Scot T. Hooper, Keynotes, vol. 36 No. 3, Mar. 1990, p. 24.

Primary Examiner—Donnie L. Crosland
Attorney, Agent, or Firm—Flynn, Thiel, Boutell & Tanis

[57] ABSTRACT

An accessory for use with a vehicle, equipped with a vehicle anti-theft system, and an interrogator device for the anti-theft system. The accessory includes a connector arrangement for establishing between the vehicle anti-theft system and the interrogator device an electrical current carrying path which passes through the vehicle ignition lock cylinder mechanism. An ignition key arrangement is provided which is cooperable with the connected arrangement and permits mechanical operation of the vehicle ignition switch mechanism while the electrical current carrying path remains established.

20 Claims, 2 Drawing Sheets

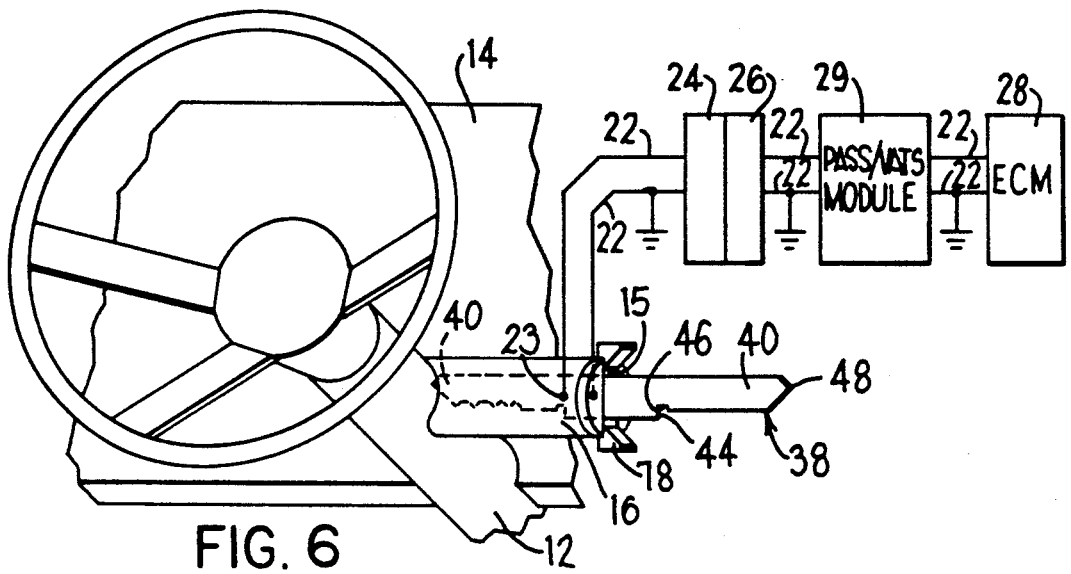
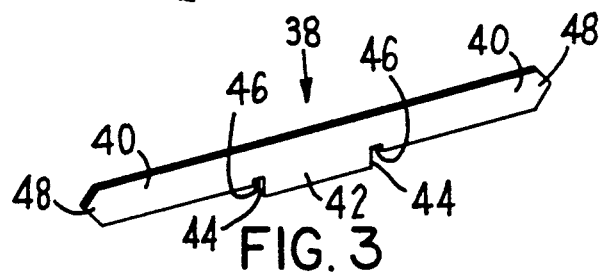
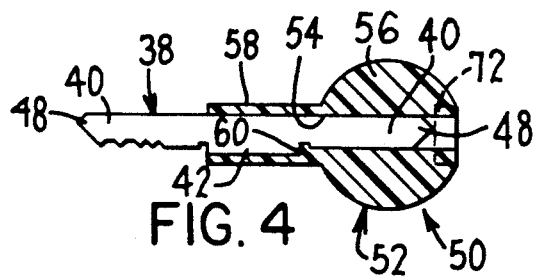
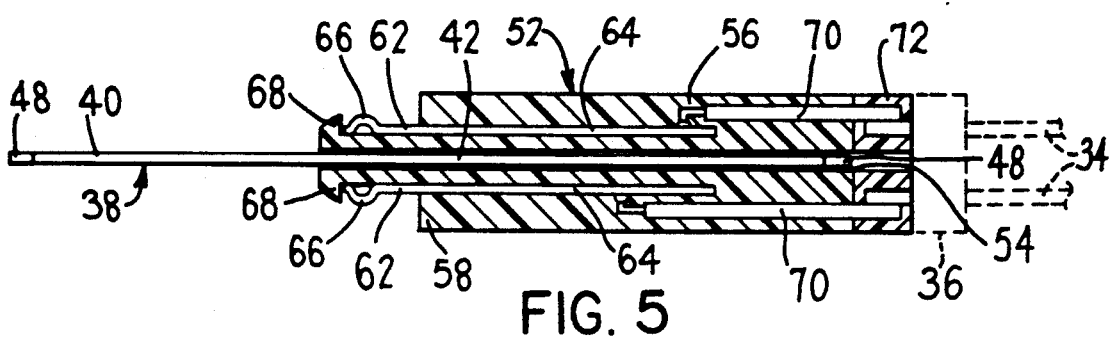

VATS INTERROGATOR ACCESSORY

FIELD OF THE INVENTION

The present invention relates to an accessory for use with a vehicle anti-theft system and, more particularly, to an accessory which facilitates conveniently connecting a VATS Interrogator to the vehicle anti-theft system through the vehicle ignition lock cylinder opening.

BACKGROUND OF THE INVENTION

A Vehicle Anti-Theft System (VATS) is conventionally provided on several automobiles now produced in the United States. For example, all 1986 and newer Chevrolet Corvettes feature a conventional VATS. As illustrated in FIG. 1, the VATS includes an ignition key 18 which carries a resistor pellet 20. The ignition key 18 is insertable into the key hole 15 of a conventional ignition switch or lock cylinder mechanism 16 supported on a conventional steering column 12. An electronic control module (ECM) 28, which includes a computer, is electrically connected to electrical contacts 23 in the vehicle ignition lock cylinder mechanism 16 via a PASS/VATS module 29, electrical conductors 22, and connectors 24 and 26. Several different resistor pellets 20 are currently in use, each one representing a distinct electronically detectable key identification code. When the key 18 is inserted into the ignition lock cylinder mechanism 16, the resistor pellet 20 is inserted snugly between the contacts 23 and is thereby placed in circuit with the PASS/VATS module 29. The computer in the ECM 28 is programmed to allow the vehicle to start only if it receives a signal from the PASS/VATS module 29 that the key identification code represented by the resistor pellet 20 matches a master key identification code which is programmed in the PASS/VATS module 29.

If the ignition key for the vehicle is lost, a replacement key can be cut in conformity with the key code on the ignition lock cylinder or from the original key "knock outs". However, without the proper resistor pellet 20, the ECM 28 will not allow the vehicle to start. It is therefore necessary to determine which particular key identification code was programmed into the PASS/VATS module 29 as its master code. Once this master code is determined, the proper resistor pellet 20 can be provided on the previously cut replacement key 18, and the vehicle can be started.

For the purpose of determining which master key identification code was programmed into the PASS/VATS module 29, a VATS Interrogator is conventionally provided. The VATS Interrogator provides selective electrical access to fifteen resistor pellets which are currently used to produce fifteen distinct key identification codes. A diagrammatic illustration of such a conventional VATS Interrogator is designated by reference numeral 30 in FIG. 2. The conventional VATS Interrogator is available as Part No. J 35628 from Burroughs Automotive Division of SPX Corporation, located in Roseville, Mich.

Referring to FIGS. 1 and 2, the VATS Interrogator has heretofore been used in the following manner to determine the master key identification code of the PASS/VATS module 29. First, the connectors 24 and 26 are separated to allow the VATS Interrogator 30 to be electrically connected to the PASS/VATS module 29. For this purpose, the terminals 32 of the VATS Interrogator 30 are typically connected via conductors 34 to a connector 36. The connector 36 is then connected appropriately to the connector 26 (this connection not being shown) so that the VATS Interrogator 30 and the PASS/VATS module 29 are electrically connected via the conductors 34, the connectors 36 and 26, and the conductors 22. With the Interrogator connected in circuit with the PASS/VATS module 29 in this manner, any one of the resistor pellets 20 in the Interrogator 30 can be selectively placed in circuit with the PASS/VATS module 29.

With the desired resistor pellet in circuit with the PASS/VATS module 29, the replacement key 18 is turned in the ignition lock cylinder mechanism in an attempt to start the vehicle. However, the vehicle will not start unless the selected resistor pellet 20 of the VATS Interrogator 30 corresponds to the master key identification code of the PASS/VATS module 29. Thus, the resistor pellets 20 of the interrogator 30 are sequentially switched into circuit with the PASS/VATS module 29, and the key 18 is turned in the ignition lock cylinder mechanism 16, until the vehicle starts, thus identifying the correct resistor pellet 20 which corresponds to the master key identification code. Thereafter, the key 18 can be provided with the correct resistor pellet 20 as identified by the foregoing procedure.

In order to prevent a thief from using the VATS Interrogator 30 to quickly determine the proper resistor pellet 20 and simultaneously start the vehicle, the PASS/VATS module 29 is conventionally provided with a timer which prevents the vehicle from starting for a predetermined period of time after any unsuccessful starting attempt in which an incorrect resistor pellet 20 was used. Accordingly, the VATS Interrogator 30 is also provided with a timer which can be activated by the user after each unsuccessful starting attempt, and which provides a visual or audible indication that the predetermined time has expired. In the conventional VATS and VATS Interrogator, the predetermined time is typically four minutes.

The connectors 24 and 26 are multiple pin connectors, and are located between the PASS/VATS module 29 and the ignition lock cylinder mechanism 16, typically inconveniently behind or under the vehicle dashboard. Thus, access thereto is extremely difficult. Usually, the dashboard needs to be removed to gain access to the connectors. Thus, it has heretofore been difficult to electrically connect the VATS Interrogator 30 to the PASS/VATS MODULE 29 because of the difficulty involved in disconnecting the connectors 24 and 26 and connecting the connector 36 to the correct pins in the connector 26. It is therefore desirable to provide an apparatus which facilitates establishing in a quick and simple manner the necessary electrical connection between the VATS Interrogator 30 and the PASS/VATS module 29.

Accordingly, it is an object of the present invention to provide an accessory which facilitates establishing in a quick and simple manner an electrical connection between the PASS/VATS module and the VATS Interrogator.

It is a further object of the invention to provide an accessory, as aforesaid, which can perform the starting function associated with a conventional ignition key while making the aforesaid quick and simple electrical connection between the PASS/VATS module and the VATS Interrogator through the vehicle ignition lock cylinder opening.

It is a further object of the present invention to provide an accessory, as aforesaid, which is of durable construction, is easily portable, is easily manufactured and is accurate.

SUMMARY OF THE INVENTION

The objects and purposes of the invention, including those set forth above, are met by providing an accessory for use with a VATS and a VATS Interrogator, which accessory includes a connector arrangement for establishing between the VATS and the VATS Interrogator an auxilliary electrical current carrying path which passes from the ignition lock cylinder mechanism of the vehicle to the VATS Interrogator. An ignition key arrangement is cooperable with the connector arrangement and permits mechanical operation of the vehicle ignition lock cylinder mechanism while the auxilliary electrical current carrying path to the VATS Interrogator remains established.

BRIEF DESCRIPTION OF THE DRAWINGS

Other objects and purposes of the invention will be apparent to those of ordinary skill in the art upon referencing the exemplary embodiment of the invention described in detail hereinafter and with reference to the drawings, in which:

FIG. 3 is a perspective view of a key blank used in the accessory of the present invention;

FIG. 4 is a sectional side view of part of the inventive accessory;

FIG. 5 is an enlarged sectional top view of the part of the accessory shown in FIG. 4; and FIG. 6 is a view generally similar to FIG. 1, but showing the key blank of FIG. 3 inserted in the vehicle ignition lock cylinder mechanism.

DETAILED DESCRIPTION

Figure 2:
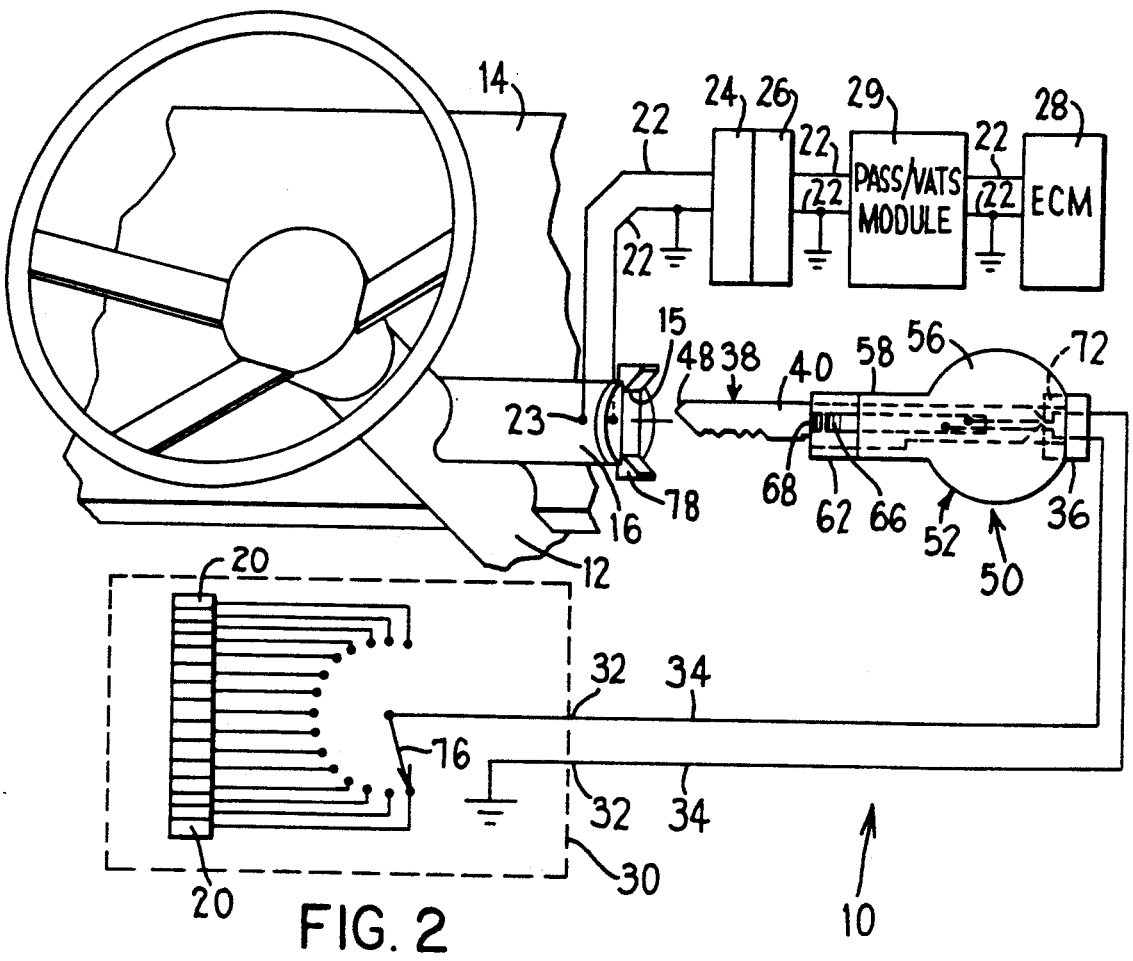
FIG. 2 is a diagrammatic illustration showing the manner in which the VATS Interrogator accessory of the present invention is used to electrically connect the VATS Interrogator with the PASS/VATS module.

Referring to FIG. 2, the accessory 10 of the present invention includes a key handle adaptor 50 and a key member 38. More specifically, and referring to FIG. 3, a platelike elongate, double-ended key blank 38 includes a central base part 42 and two stems 40 extending in opposite directions therefrom. The part 42 is slightly wider than the stems 40, such that shoulders 44 which face outwardly toward the respective stems 40 are formed respectively where each stem 40 joins the central part 42. Each stem 40 has a notch 46 formed therein adjacent the base part 42 and adjoining the respective shoulders 44. Each stem includes a tapered free end 48 opposite the notch 46. The key blank 38, in the preferred embodiment, is substantially thinner than conventional key blanks, which normally include lengthwise extending channels or grooves. The key blank 38 preferably has a very thin, planar construction.

Figure 1:
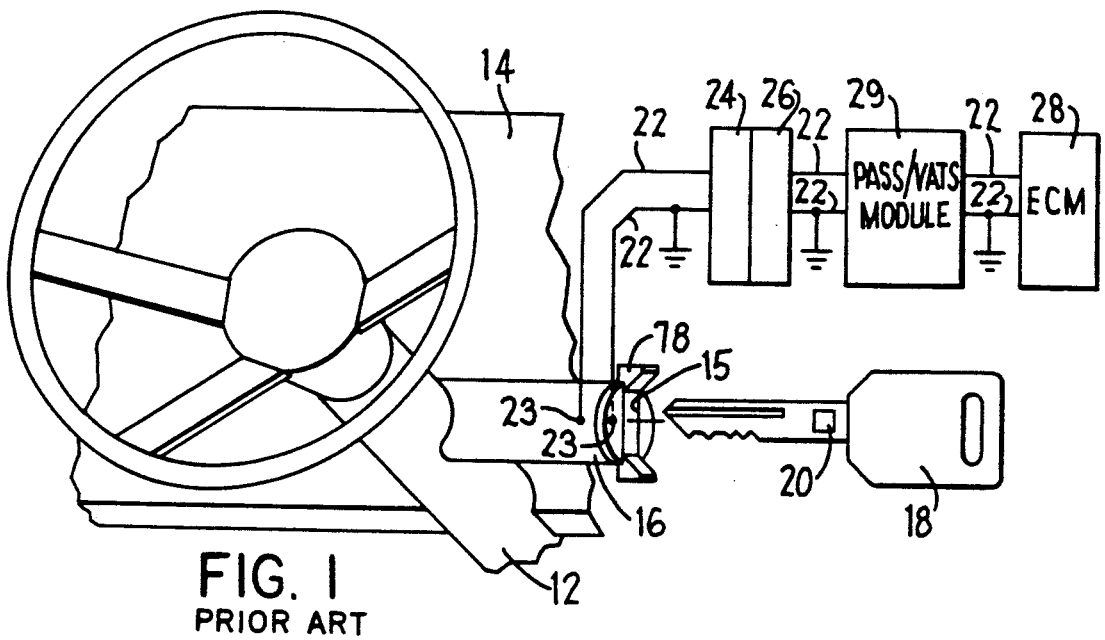
FIG. 1 is a diagrammatic illustration of a conventional VATS, including an electronic control module and an ignition key provided with a resistor pellet.

Since the vehicle must actually be started in order to determine which resistor pellet 20 of the VATS Interrogator 30 corresponds to the master key identification code of the PASS/VATS module 29, and since starting the vehicle obviously requires that the ignition lock cylinder mechanism 16 be successfully operated, the key blank 38 is used as a substitute for the ignition key 18 shown in FIG. 1, assuming that the original set of ignition keys has been lost. Accordingly, the proper notches are formed in one stem 40 of the key blank 38 using a conventional key cutting apparatus. The newly notched stem 40 is then inserted into the ignition lock cylinder mechanism 16 (FIG. 6) in the same manner as a conventional ignition key. About one-half of the length of the key blank 38 remains exposed. Since the ignition switch mechanism 16 can now be operated by the inserted notched stem 40 and since the EMC 28 will not permit the engine to start until the correct resister pellet is connected in circuit with the PASS/VATS module 29, all that remains is to provide an electrical connection between the PASS/VATS module 29 and the VATS Interrogator 30.

Referring to FIG. 2, the electrical connection between the PASS/VATS module 29 and the VATS Interrogator 30 is effected using a key handle adaptor 50, a connector 36, and conductors 34. Referring to FIGS. 4 and 5, the key handle adaptor 50 includes a bulb-shaped body 52 having a round, substantially cylindrical head 56 with flat axially facing ends and a rectangular projecting part 58 which projects radially outwardly from the outer circumferential edge of the round head 56. The head 56 has a flat radial edge opposite the part 58, and a connector receptacle 72 (illustrated in FIGS. 2, 4 and 5) opens radially oppositely of the part 58. The projecting part 58 forms a rectangular prism having the same thickness as the round head 56 such that the body 52 is confined between two parallel planes. A thin tab 62 projects outwardly from a free end of the part 58 and is thinner than same, as shown in FIG. 5. A continuous, slot-like through hole 54 of rectangular cross-section extends centrally through the thin tab 62, the projecting part 58, and the round head 56, thus extending centrally through the entire length of the bulb-shaped body 52. The height of the slot-like through hole 54 is slightly less in the head 56 than in the projecting part 58, defining a shoulder 60 in the through opening 54 which has a height equal to the aforementioned height difference. In this particular embodiment, the shoulder 60 is located at the juncture of the head 56 and projecting part 58, and faces the projecting part 58.

Referring specifically to FIG. 5, two elongated, platelike electrical terminals 64 are embedded in the body 52 and extend on opposite sides of and parallel to the central through opening 54. The terminals 64 are spaced from each other by an amount approximately equal to the thickness of the tab 62. The terminals 64 have free end portions which extend out of the body 52 and rest on opposite outwardly facing sides of the tab 62, but the portions of the electrical terminals 64 which are embedded in the body 52 are much longer than the exposed free end portions thereof. These exposed free end portions of the terminals 64 define bead-like electrical contacts 66 which have a concave side facing the tab 62 and a convex side facing away from the tab 62. The free ends of the bead-like contacts 66 rest against the tab 62 and a substantially semi-circular space is defined between each contact 66 and the tab 62.

The tab 62 includes at its free end noses 68 which project from the sides thereof on which the contacts 66 rest. Each nose 68 extends perpendicularly away from the tab surface on which the associated contact 66 rests for a distance approximately equal to the radius of curvature of the contacts 66. The free ends of the contacts 66 also abut the noses 68. The noses 68 taper away from the contacts 66 and inwardly toward the through opening 54 to define the end of the tab 62.

Referring to FIG. 5, electrical conductors 70 are embedded in the head 56 of the body 52, and each conductor 70 is electrically connected to a respective electrical terminal 64 within the body 52. The terminals 64 and the connectors 70 are positioned symmetrically about the central through hole 54, the terminals 64 being closer to the through hole 54. The conductors 70 extend generally parallel to the hole 54 and into the receptacle 72. The conductors 70 are connected at their ends opposite the terminals 64 to the aforementioned connector 36, which is received in the receptacle 72.

Referring to FIG. 6, the use of the accessory 10 will now be described. The key handle adaptor 50 is positioned with its projecting part 58 directed toward the key blank 38, and such that the exposed stem 40 is aligned with the slot-like through hole 54. The height of the through hole 54 is great enough throughout the entire length of the body 52 to accommodate the exposed stem 40 of the key blank 38. The key handle adaptor 50 is moved toward the key blank 38 and the exposed stem 40 is received within the through hole 54. As the key handle adaptor 50 is moved further toward the ignition lock cylinder mechanism 16, the stem 40 moves further into the through hole 54. Eventually, the thin tab 62 is received within the ignition lock cylinder mechanism 16, along with the contacts 66. As illustrated in FIG. 4, the exposed shoulder 44 of the key blank 38 engages the shoulder 60 in the through hole 54 to thereby limit the amount of the key blank 38 which is lengthwise slidably received in the through hole 54. The entire base part 42 of the double-ended key blank 38 is accommodated within the tab 62 and projecting part 58 when the shoulder 44 engages the shoulder 60. Also, the entire length of the exposed stem 40 is accommodated within the round head 56. Thus, as illustrated in FIGS. 2 and 4, all of the double-ended key blank 38 except the notched stem 40 is accommodated within the body 52 of the key handle adaptor 50. It should be obvious from FIG. 2 that, alternatively, the key blank 38 may first be inserted into the through hole 54, so as to be supported cantilever style by the key handle adaptor 50, and thereafter the notched stem 40, tab 62, and contacts 66 may be inserted into the ignition switch mechanism 16.

With the notched stem 40 inserted in the ignition lock cylinder mechanism 16, and the shoulder 44 of the key blank 38 abutting the shoulder 60 in the through hole 54, the contacts 66 are positioned between the VATS contacts 23 within the ignition lock cylinder mechanism 16. The concave outer surfaces of the contacts 66 are spaced apart from one another by an amount approximately equal to the thickness of the resistor pellets 20, so that the contacts 66 make electrical contact with the contacts 23 in the same way as the resistor pellets 20. Referring to FIG. 2, the VATS Interrogator connector 36 is then plugged into the connector receptacle 72 of the key handle adaptor 50, thereby completing the required electrical connection between the PASS/VATS module 29 and the VATS Interrogator 30.

Thus, as described above, one of the resistor pellets 20 in the VATS Interrogator is selected, using the adjustable rotary selector switch 76 on the VATS Interrogator 30, and an attempt is made to start the vehicle using the notched stem 40 of the key blank 38. From this point, the above-described "trial and error" method is employed to determine which of the resistor pellets 20 corresponds to the master key identification code of the PASS/VATS module 29. Because of the very thin planar structure of the key blank 38, it is desirable to grasp both the enlarged head 56 and the "wings" 78 conventionally associated with the ignition lock cylinder mechanism 16, in order to avoid breaking the key blank 38.

It should be obvious from the foregoing disclosure that the electrical terminals 64 must be made of an electrically conductive material (e.g., copper, aluminum) and the body 52 of the adaptor 50 must be made from an electrically insulative material (e.g., plastic). Moreover, it should also be obvious that the electrical conductors 70 are connected to the electrical terminals 64 in a conventional manner (e.g., by soldering).

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. An accessory for use with a vehicle anti-theft system, the vehicle including vehicle wiring harness means and starting means for facilitating through the wiring harness means a starting of a vehicle engine, said starting means including a vehicle ignition lock cylinder mechanism and an electronic means electrically connected to the vehicle ignition lock cylinder mechanism for facilitating a starting of the vehicle engine, said electronic means being responsive to a predetermined electronically detectable key identification code in order to effect the starting of the vehicle engine, the lack of which key identification code preventing a starting of the vehicle engine, even when an ignition key successfully mechanically operates the vehicle ignition lock cylinder mechanism, said accessory comprising:

conductor means separate from and external to the vehicle wiring harness means for conducting electric current; and adaptor means adapted to be received in the vehicle ignition lock cylinder mechanism for effecting within the vehicle ignition lock cylinder mechanism an electrical connection between said conductor means and the vehicle anti-theft system and for thereby obtaining electrical access to the vehicle anti-theft system through said adaptor means and said conductor means for facilitating an experimental determining of a key identification code encoded in the vehicle anti-theft system.

2. The accessory according to claim 1, wherein said conductor means includes detachable electrical connection means adapted to be connected in electrical circuit with an electrical device at a location remote from the vehicle ignition lock cylinder mechanism, which electrical device facilitates a determining of the key identification code, and wherein said adaptor means includes a key handle adaptor which is receivable within a key hole in the vehicle ignition lock cylinder mechanism and includes electrical terminals thereon, said electrical terminals being electrically connected to said conductor means.

3. The accessory according to claim 2, wherein said adaptor means includes a key member which is removably supportable on said key handle adaptor and receivable in the key hole in the ignition lock cylinder mechanism.

4. The accessory according to claim 3, wherein said key member includes a base part and a key stem extending therefrom, said base part being removably supportable on said key handle adaptor with said key stem being cantilevered therefrom, said key stem being shaped so as to permit a successful mechanical operation of the ignition lock cylinder mechanism and being receivable in the key hole in the ignition lock cylinder mechanism.

5. The accessory according to claim 4, wherein said key handle adaptor includes a body having means defining an opening therein, said base part being slidably receivable in said opening, said electrical terminals being supported on said body, and wherein said opening and said base part of said key member, when received in said opening, are disposed between said electrical terminals.

6. The accessory according to claim 5, wherein each said electrical terminal has an electrical contact provided at one end thereof, wherein said key handle adaptor includes a tab which projects in cantilever fashion from said body, said electrical contacts being supported against opposite sides of said tab, wherein said opening and said key member, when received therein, extend through said tab, and wherein said tab and said electrical contacts are receivable in the key hole in the ignition lock cylinder mechanism along with said key stem.

7. The accessory according to claim 6, wherein said tab has at a free end thereof laterally projecting protective noses against which said electrical contacts abuttingly engage, and wherein respective portions of said electrical terminals and said conductor means are embedded in said body of said key handle adaptor, said electrical connection of said conductor means to said electrical terminals also being embedded in said body.

8. The accessory according to claim 7, wherein said electrical terminals are bent at said one end thereof such that said electrical contacts are of a bead-like configuration having generally oppositely facing concave and convex sides, said tab being disposed snugly between said contacts with said concave sides of said contacts facing said tab.

9. The accessory according to claim 5, wherein said body of said key handle adaptor includes means defining a shoulder inside said opening, said base part of said key member being engagable against said shoulder when received in said opening, whereby the amount of said key member received in said opening is limited, said key member having a thin, planar construction and having a pair of oppositely facing lateral surfaces which are smooth, planar and free of grooves.

10. A method for determining which one of a plurality of possible electrical key identification codes is associated with a vehicle anti-theft system, the vehicle anti-theft system being electrically connected to an ignition lock cylinder mechanism of a vehicle, which ignition lock cylinder mechanism, when activated, is capable of starting the vehicle engine comprising the steps of:
providing a key blank;
providing a key handle adaptor;
providing a vehicle anti-theft system interrogator having means for providing electrical access to at least one electronically detectable key identification code;
cutting the key blank to a predetermined shape to match the vehicle ignition lock cylinder mechanism;
inserting the key blank into the ignition lock cylinder mechanism;
inserting the key handle adaptor into the ignition lock cylinder mechanism to electrically connect the vehicle anti-theft system to the interrogator; and
attempting to start the vehicle by turning the key blank in the ignition lock cylinder mechanism.

11. The method according to claim 10, including the further steps of waiting for a predetermined period of time, using the interrogator to select a different key identification code, and executing again said step of attempting to start the vehicle.

12. An accessory for use with a vehicle anti-theft system and an interrogator for the vehicle anti-theft system, the vehicle including vehicle wiring harness means and starting means for facilitating through the wiring harness means a starting of a vehicle engine, said starting means including a vehicle ignition lock cylinder mechanism and an electronic means electrically connected to the vehicle ignition lock cylinder mechanism for facilitating a starting of the vehicle engine, said electronic means being responsive to a predetermined electronically detectable key identification code in order to effect the starting of the vehicle engine, the lack of which key identification code preventing a starting of the vehicle engine, even when an ignition key successfully mechanically operates the vehicle ignition lock cylinder mechanism, and the interrogator including means for providing selective electrical access to a plurality of distinct, electronically detectable key identification codes, said accessory comprising:
connector means for establishing between the vehicle anti-theft system and the interrogator an electrical current carrying path which passes through the ignition lock cylinder mechanism; and
ignition key means cooperable with said connector means for permitting mechanical operation of the ignition lock cylinder mechanism while said electrical current carrying path remains established.

13. The accessory according to claim 12, wherein said connector means includes detachable electrical connection means adapted to be connected in electrical circuit with the interrogator, and a key handle adaptor which is receivable within a key hole in the ignition lock cylinder mechanism.

14. The accessory according to claim 13, wherein said ignition key means includes a key member which is removably supportable on said key handle adaptor and receivable in the key hole in the ignition lock cylinder mechanism.

15. The accessory according to claim 14, wherein said key member includes a base part and a key stem extending therefrom, said base part being removably supportable on said key handle adaptor with said key stem being cantilevered therefrom, said key stem being shaped so as to permit a successful mechanical operation of the ignition lock cylinder mechanism and being receivable in the key hole in the ignition lock cylinder mechanism.

16. The accessory according to claim 15, wherein said key handle adaptor includes a body having means defining an opening therein, said base part being slidably receivable in said opening, said body having electrical terminals supported thereon, and wherein said opening and said base part of said key member, when received in said opening, are disposed between said electrical terminals.

17. The accessory according to claim 16, wherein each said electrical terminal has an electrical contact provided at one end thereof, wherein said key handle adaptor includes a tab which projects in cantilever fashion from said body, said electrical contacts being supported against opposite sides of said tab, wherein said opening and said key member, when received therein, extend through said tab, and wherein said tab and said electrical contacts are receivable in the key hole in the ignition lock cylinder mechanism along with said key stem.

18. The accessory according to claim 17, wherein said tab has at a free end thereof laterally projecting protective noses against which said electrical contacts abuttingly engage, wherein said connector means includes electrical conductors, and wherein respective portions of said electrical terminals and said electrical conductors are embedded in said body of said key handle adaptor, each said conductor being electrically connected within said body to a respective said electrical terminal.

19. The accessory according to claim 18, wherein said electrical terminals are bent at said one end thereof such that said electrical contacts are of a bead-like configuration having generally oppositely facing concave and convex sides, said tab being disposed snugly between said contacts with said concave sides of said contacts facing said tab.

20. The accessory according to claim 19, wherein said body of said key handle adaptor includes means defining a shoulder inside said opening, said base part of said key member being engagable against said shoulder when received in said opening, whereby the amount of said key member received in said opening is limited, said key member having a thin, planar construction and having a pair of oppositely facing lateral surfaces which are smooth, planar and free of grooves.

* * * * *

UNITED STATES PATENT AND TRADEMARK OFFICE
CERTIFICATE OF CORRECTION

PATENT NO. : 5 086 288
DATED : February 4, 1992
INVENTOR(S) : Carl STRAMER

It is certified that error appears in the above-identified patent and that said Letters Patent is hereby corrected as shown below:

Col. 10, line 10; change "claim 19" to ---claim 16---.

Signed and Sealed this

Thirtieth Day of November, 1993

Attest:

BRUCE LEHMAN

Attesting Officer

Commissioner of Patents and Trademarks